May 25, 1926.  1,585,680
J. F. O'CONNOR
FRICTION SHOCK ABSORBING MECHANISM
Filed May 5, 1924  2 Sheets-Sheet 2
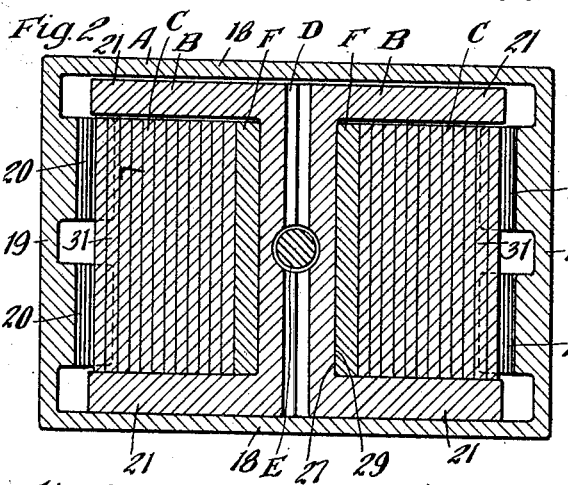
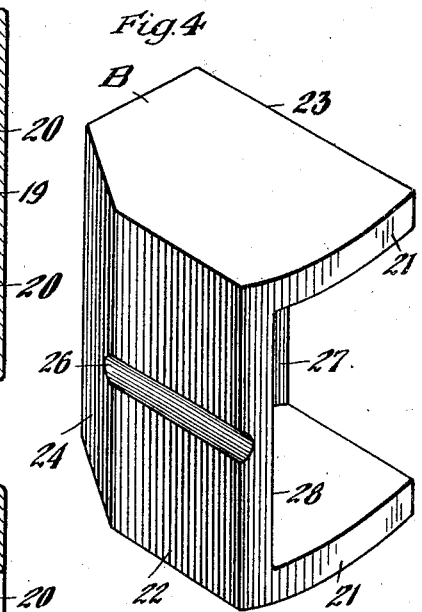
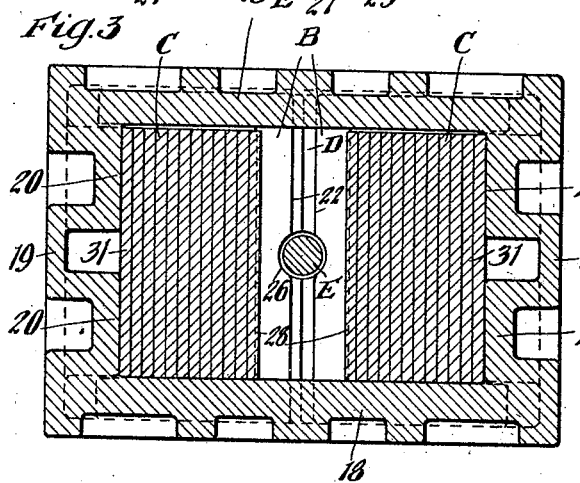
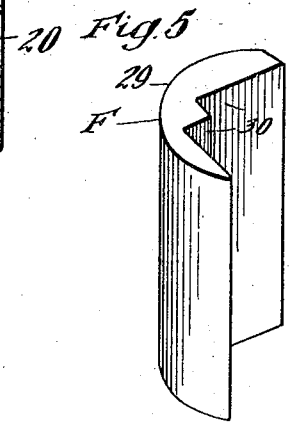
Witnesses
Wm. Geiger
Inventor
John F. O'Connor
By George D. Haight
His Atty.

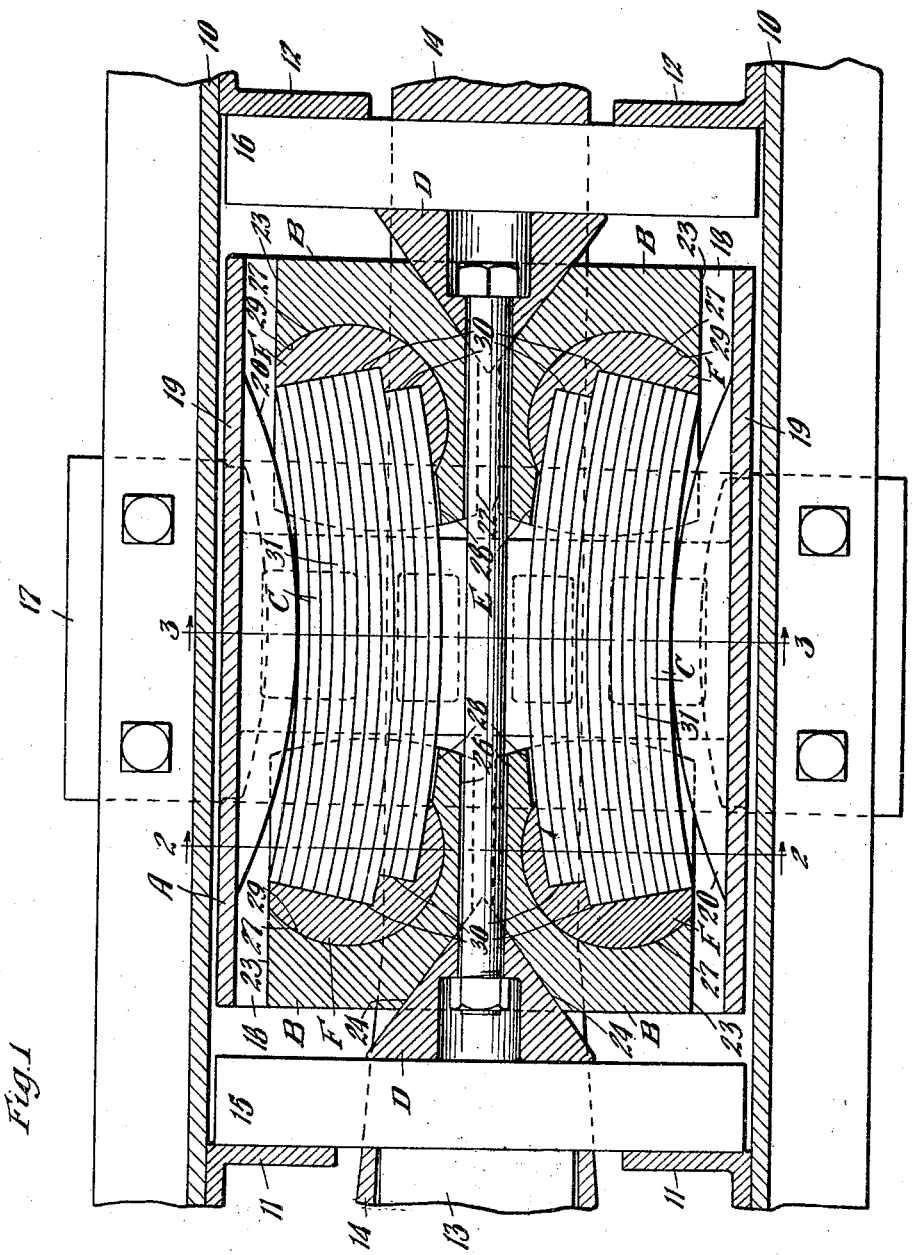

Patented May 25, 1926.

1,585,680

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 5, 1924. Serial No. 711,026.

This invention relates to improvements in friction shock absorbing mechanisms.

One object of the invention is to provide a friction shock absorbing mechanism, especially adapted for railway draft riggings, wherein are obtained high capacity and easy release.

A specific object of the invention is to provide a friction mechanism of the character indicated, wherein are employed groups of spring friction plates for developing not only a strong resistance to movement of certain cooperating sliding friction elements, but also developing an additional amount of frictional resistance between each other as they are flexed.

Other objects and advantages of my invention will more clearly appear from the description and claims hereinafter following.

In the drawings forming a part of this specification, Figure 1 is a horizontal, longitudinal sectional view of a portion of a railway draft rigging showing my improvements in connection therewith. Figures 2 and 3 are vertical, transverse sectional views of the shock absorbing mechanism proper, corresponding to the section lines 2—2 and 3—3 respectively of Figure 1. Figure 4 is a perspective view of one of the carrier members. And Figure 5 is a perspective view of one of the bearing members for supporting the springs at their ends.

In said drawings, 10—10 denote channel shaped draft sills of a car underframe, to the inner faces of which are secured front stop lugs 11 and rear stop lugs 12. A portion of the drawbar is indicated at 13, the same being operatively associated with a hooded cast yoke 14 within which is disposed the shock absorbing mechanism proper. The shock absorbing mechanism is mounted within the yoke 14, as are also a front follower 15 and a rear follower 16. The yoke and the parts disposed therein are operatively supported by a detachable saddle plate 17.

The improved shock absorbing mechanism proper, as shown, comprises broadly, a casing A; four spring plate carriers B; two groups of spring plates C; wedge blocks D; and a retainer bolt E.

The casing A is of hollow rectangular form, provided with top and bottom parallel walls 18—18 and side walls 19—19. Each of the side walls 19 is formed on its inner side with a pair of laterally spaced, inwardly extending convex bearings 20, serving as fulcrum bearings for the respective set of spring plates C disposed opposite thereto.

The carriers B are of like construction and each is provided with parallel top and bottom walls 21, and walls 22 and 23, the wall 22 being inclined as at 24 to provide an inclined face to coact with one of the wedge members D, as will be hereinafter described. A shallow groove 26 is formed along the center line of the face 22 to provide clearance for the retaining bolt E. Each of the carrier members is provided with a socket opening into the side and one end thereof, said socket having a cylindrical bounding wall or bearing face 27 to receive a bearing member or block F, as will be hereinafter described. One wall or face of the socket is flat as at 28, said flat face intersecting the arcuate face 27.

Oscillatably mounted in the sockets of the carrier members are bearing members or blocks F, having a cylindrical bearing face 29 to coact with the cylindrical bearing face 27, said bearing members being also provided with stepped shoulders 30 therein to act as abutments or seats for the ends of the spring plates C.

Between each pair of carrier members arranged on the same side of the center line of the draft rigging is disposed a group of spring steel friction plates, individually designated as 31, and together constituting a group C hereinbefore referred to. The plates are curved in a direction longitudinally of the draft rigging, the outermost plate of each group bearing against the spaced fulcrum bearings 20, intermediate the ends of the outer plate. The plates are inserted in place with an initial compression so that their ends exert a longitudinal thrust against the shoulders 30, tending to force the carrier members longitudinally in opposite directions and acts to automatically compensate for wear between the inclined wedge faces 24 and the wedge faces of the wedge member D, the latter being positioned in the center line of the mechanism.

The retainer bolt E is anchored at its ends in suitable sockets provided in the wedge members D so that the overall length of the mechanism may be maintained constant and also the springs maintained under an initial flexure or compression, as hereinbefore described.

Upon a compression stroke, it is evident that the wedge members D will coact with the wedge faces of the carrier members to move said carrier members outwardly toward the side walls of the casing, this outward movement being resisted by the spring plates and acting to bend or flex the spring plates about the fulcrum bearings 20. The bearing members or blocks at the ends of the gangs of springs oscillate on the carrier members, thus adding more frictional resistance. Not only will friction be generated, as described, but further friction will be generated between adjacent plates of each group of springs as the latter are flexed inwardly of the respective carriers, the carriers being shifted laterally during the compression stroke. As soon as the load is released, the springs will straighten to their normal position, thus automatically moving the parts to normal position.

Inasmuch as the springs are placed under an initial tension, any wear occurring between the wedge members D and the cooperating wedge faces of the carriers will be automatically compensated for.

I have herein shown and described what I now consider the preferred manner of carrying out my invention but the same is merely illustrative and I contemplate all changes and modifications that come within the scope of the claims appended hereto.

I claim:

1. In a friction shock absorbing mechanism, the combination with a pair of longitudinally disposed carriers; of a group of spring plates pivotally mounted at their ends on said carriers; a casing encircling said carriers and plates and provided with fulcrum bearings for the flexing of said plates; and wedge friction elements at the ends of said carriers and coacting with means associated with said mechanism to wedge them laterally upon relative approach of said wedge elements.

2. In a friction shock absorbing mechanism, the combination with a casing having interior, laterally opposed fulcrum bearing surfaces; of a pair of groups of spring plates disposed within said casing, each group engaging one of said fulcrum bearing surfaces; a plurality of carriers, each pivotally engaging one of said groups of spring plates, and having wedge shaped ends; and wedge means coacting with said wedge shaped ends of the carriers to operate the latter upon relative approach of said wedge means to flex said springs on said fulcrum bearings.

3. In a friction shock absorbing mechanism, the combination with a casing having an interior fulcrum bearing; of a pair of longitudinally spaced carriers, one at each end of said casing, said carriers having wedge-shaped ends; a wedge member at each end of said casing and coacting with means associated with said mechanism and with said wedge-shaped ends of said carriers to move the latter laterally toward said casing wall; and a spring, curved longitudinally of said casing and having its opposite ends rotatably supported in said carriers and normally engaging said fulcrum bearing intermediate its ends so as to resiliently resist lateral movement of said carrier when the latter is actuated by said wedge member, and to automatically compensate for wear between the wear faces of said carriers and said wedge members.

4. In a friction shock absorbing mechanism, the combination with a pair of longitudinally opposed carriers, each having an arcuate socket; of spring-receiving members having cylindrically formed exteriors oscillatably seated in said sockets and provided with opposed shoulders; a group of spring plates curved longitudinally of the shock absorbing mechanism and having its ends seated against the shoulders of said spring receiving members; a fulcrum bearing arranged intermediate the ends of said group of springs; and means for moving said carriers laterally during the compression stroke so as to flex said springs about said fulcrum bearing, said spring-receiving members being permitted to oscillate in said sockets during said flexing movement of the spring plates.

5. In a friction shock absorbing mechanism, the combination with a hollow rectangular casing provided with opposed fulcrum bearing surfaces on its inner faces; of two pairs of carriers, one of each pair arranged laterally at each end of the casing; spring plates pivotally mounted between the carriers of each pair and adapted to be flexed on said fulcrum bearing surfaces; and wedge means at each outer set of ends of the carriers cooperable therewith, said carriers at each end being adapted to separate and effect a lateral movement of the carriers during a compression stroke.

6. In a friction shock absorbing mechanism, the combination with a casing having interior fulcrum bearing surfaces at its opposite sides; of a pair of carriers arranged one on each side of the longitudinal center of the casing at each end of the latter; a gang of leaf springs interposed between each pair of carriers; a bearing member oscillatably arranged in each of said carriers and open at one side to removably receive the ends of said springs; and wedge means coacting with both the carriers at each end of the casing.

7. In a friction shock absorbing mechanism, the combination with a pair of longitudinally opposed carriers arranged laterally of each side of the center of said mechanism, each carrier having an arcuate socket at its inner end; of spring-receiving members having cylindrically shaped exteriors oscillatably seated in said sockets and provided with shoulders; a pair of groups of spring plates arranged laterally on opposite sides of the center of said shock absorbing mechanism, said springs being curved longitudinally of the shock absorbing mechanism and each group having its ends seated against the shoulders of said spring-receiving members; a casing surrounding said carriers and springs and having fulcrum bearings arranged intermediate the ends of each of said groups of springs; and wedge means for slidably engaging said carriers and moving the latter laterally during the compression stroke, so as to flex said springs about said fulcrum bearings, said spring-receiving members being permitted to oscillate in the sockets during said flexing movement of the springs.

8. In a friction shock absorbing mechanism, the combination with spaced pairs of carriers; means providing relatively fixed fulcrum bearing surfaces extending intermediate said pairs of carriers and arranged at opposite sides thereof; a group of spring plates associated with the carriers adjacent each fulcrum bearing surface, said spring plates bearing against the fulcrum bearing surfaces and having their end portions bearing against the related carriers to urge the same inwardly; and wedge means coacting with said carriers during compression of the mechanism to wedge said carriers apart against the pressure of said spring plates.

9. In a friction shock absorbing mechanism, including a plurality of groups of spring plates; carriers arranged adjacent the end portions of each group of spring plates; means for pivotally connecting the end portions of each group of spring plates with the cooperating carriers; relatively fixed fulcrum bearing surfaces arranged adjacent each group of spring plates and adapted to bear against the intermediate portions thereof to urge the carriers inwardly; and wedge means coacting with the juxtaposed carriers for moving the same apart against the pressure of said spring plates during an operative stroke of the mechanism.

In witness that I claim the foregoing I have hereunto subscribed my name this 30th day of April, 1924.

JOHN F. O'CONNOR.